Patented Mar. 23, 1954

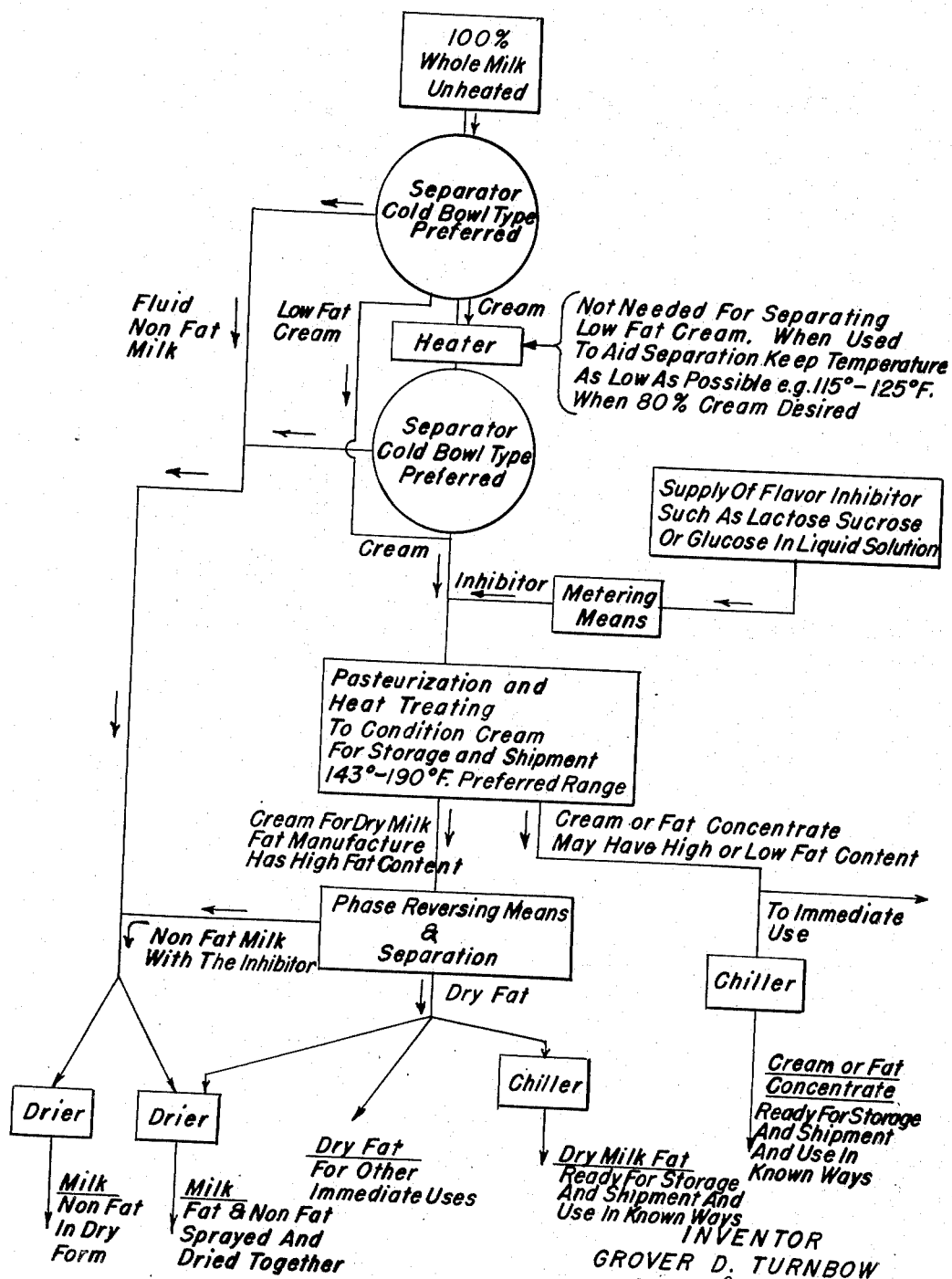

2,673,155

UNITED STATES PATENT OFFICE 2,673,155

PROCESS FOR PRESERVING THE FRESH NATURAL FLAVOR OF BUTTERFAT

Grover D. Turnbow, Piedmont, Calif., assignor to International Dairy Engineering Company, Oakland, Calif., a corporation of California Application March 31, 1951, Serial No. 218,645

34 Claims. (Cl. 99—56)

My invention relates to a method and the product thereof for producing dry milk fat or a cream or fat concentrate suitable for use in making re-combined or reconstituted milk products, or products in which milk in one form or another is used as an ingredient.

The principal object of the invention is to provide a method (and product) whereby a fresh milk product can be reduced to components in a dry or a concentrated state, shipped and stored for indefinite periods, and then be reconstituted or recombined to make normal milk, chocolate milk, cream, ice cream, cheddar cheese and other milk products without any of these having a flavor substantially different than if made with fresh milk.

The problem in the past has been that products reconstituted or recombined from various milk components (usually in dry form) will have a flavor noticeably different than the flavor of fresh milk or products made from milk in its fresh state. These flavors normally result from the heat processing to which such products are necessarily subjected and in the trade these are referred to as "off-flavor," "cooked-flavor," "stale-flavor," and the like. These off flavors have been the biggest deterrents to acceptance of such products.

The need for a method to reconstitute or recombine such milk components into a product with a flavor as acceptable as the flavor of the original fresh milk product has been demonstrated forcefully in the recent war and occupation of countries, such as in the Orient, where fresh dairy products have not been available. Also a substantial economy in storage and transportation costs can be realized in the domestic market, if an acceptable reconstituted or recombined product can be made at the point of consumption, because of the concentration and relative imperishability of the ingredients prepared for that purpose.

There are several ways of achieving the results of the invention, as outlined briefly above. I illustrate these on the flow sheet.

Briefly, the object is to divide the fresh unheated whole milk as received from the producer into component parts, impart to each a keeping quality without loss of palatability, and subsequently bring these component parts together, mix them with suitable water perhaps at a distant future and location to produce a reconstituted or recombined product having a flavor quality and nutritional value equivalent to the original whole milk. The same teaching applies where various of these components may be used as such in the manufacture of other products such as candy.

To achieve the objects of this invention, I prefer to start with fresh unheated whole milk as received from the producer (the diary) and before the milk has been subjected to heat at all, even for pasteurization. Starting with the cold, whole milk, I prefer to separate the milk by means of a cold bowl separator or separators (or some other form of separators) to provide cream containing preferably as high as 80% fat, or an even higher fat content, and to provide fluid non-fat milk which may be processed for any particular purpose desired.

As shown on the flow sheet, if the cream concentrate desired is to be relatively low in fat content, that is in the neighborhood of 40% or less fat, then separation may be accomplished without heating and the cream can by-pass any other separating apparatus provided.

The use of a heater at present seems preferable in connection with separating the fat and non-fat components where it is desired to obtain a fat having more than 40% fat content. In this heater the preferred top temperature range is 115° to 125° F. to obtain an 80% fat. The temperature should be kept as low as possible and still give the desired percentage of fat and non-fat separation.

The use of cold bowl separators is preferred only because I want to handle the milk at as low temperatures as is practical until certain acceptable food substances which will prevent the deterioration in flavor quality of the fat have been added. These substances I refer to as inhibitors or off-flavor inhibitors.

This invention has to do primarily with the processing of the cream or fat of the milk into a concentrated form possessing a much greater degree of excellence of flavor than is now possible with existing methods for pasteurization or processing. To accomplish this objecitve, I add to the cream or cream concentrate sufficient of an off-flavor inhibitor, in the form of a concentrated lactose solution, to give about 12% by weight added lactose in the water phase of the cream, before the cream is subjected to heat treatment and pasteurization. I may substitute other inhibitors such as sucrose, or glucose, or other sugars or mixtures of sugars with higher sweetening effect when it is advantageous to do so. The inhibitor may be dissolved in a suitable carrier such as water or non-fat milk for metering into the cream before processing temperatures have risen substantially. It is important that the off-flavor inhibitor be mixed in before the cream reaches a temperature that is injurious to the flavor. The cream is then subjected to pasteurizing and heat treating to the desired temperature. With the off-flavor inhibitor present at the time of heating, the fat of the cream seems not to take on any objectionable off-flavor. What occurs chemically or what is the exact nature of the product has not yet been fully determined and will be the subject of a later application for patent.

For pasteurization and heat treating I have found that temperatures which are carefully controlled in the 140° to 190° range are preferable. The temperature chosen will depend upon the kind of equipment used and whether it is of the batch type or of the continuous plate type or some other type. The temperature should not be any higher or be maintained for any longer period of time than is necessary. The temperature used may be higher than necessary for pasteurization and will be influenced by the length of time the product is expected to be held in storage or to be in shipment, how it is to be stored and the purpose for which it is to be used. The longer the storage time is to be the higher the temperature that should be used. These temperatures may be in excess of the legal minimums prescribed for pasteurization.

After the pasteurization and heat treating is accomplished, the procedures commonly employed by the industry are used to concentrate, or if desired, to dry the fat. This finished product, whether as a cream concentrate or as a dry fat, is unique in imparting a very superior flavor when used in finished products or recombined as fresh milk, and in not containing significant amounts of products which usually result from heating milk and which do impart undesirable off-flavors to the finished cream or products in which used.

The amount of skim milk (with the added off-flavor inhibitor) in the cream is very small compared to the total skim milk content of the original milk, and when separated from the fat in the phase reversing means and separator may, if desired, be returned to the main portion of the non-fat milk intended for concentration and/or drying for premium non-fat uses. When lactose is used as the off-flavor inhibitor the lactose content of the total non-fat solids is thus increased by only about 1.5%, which is little if any more of a change in lactose content than the variation naturally occurring in milk throughout the period of lactation or from individual cows.

If the treated cream is used for making a cream or fat concentrate with a high or low fat content it is not absolutely necessary to separate out the off-flavor inhibitor and the non-fat milk before making the concentrate.

To review the process briefly, the first step is to take the whole milk and separate it into an essentially non-fat portion, known to the trade as skim milk, and into a heavy cream. Preferably this cream will be in the 40% to 80% fat range depending on the end product desired, but the invention is applicable in processing cream where the fat content is above 80%, or is below 40%.

Assuming that I am starting with 100 pounds of fresh fluid milk of 4% fat, this means that 96% is non-fat milk. If the separation of the non-fat from the fat milk is to give a 40% fat cream, the cream will weigh about 10 pounds and the non-fat milk will weigh about 90 pounds. There will be 6.25% of the non-fat milk still remaining in the cream. If the separation of the non-fat from the fat milk is to give an 80% fat cream, the cream will weigh 5 pounds of which one pound will be non-fat milk. This will give a little over 1% of the original non-fat milk remaining in the cream.

The treatment of the skim milk, is not shown in detail by the flow sheet as it is a more or less standard procedure. The skim milk usually passes through to a storage tank after which it receives the heat necessary for pasteurization treatment and then it is evaporated to reduce the water content to approximately 50% or 60% after which it is spray dried to produce a powder for packaging and transportation. This final powder contains not over 3% moisture for optimum keeping quality. The powder is packed in sealed containers which require no refrigeration and are adapted to be shipped under any conditions.

The skim milk instead of being dried as aforesaid may be handled in other ways as I shall point out hereinafter.

If cream of over 40% fat content is to be obtained, it will be necessary with present day equipment to use a second separation step with the cream heated as much as necessary prior to the second separation to permit an effective separation. To obtain an 80% fat this heater may have to raise the temperature to 115° to 125° F. The heat should be kept to a minimum.

Treating a high fat cream

If cream in the neighborhood of 80% fat is to be processed, I propose to meter into this cream an off-flavor inhibitor such as lactose, glucose, or sucrose in the range of 1½ to 3 pounds of inhibitor per 100 pounds of cream, depending upon the original composition of the milk. This mixture is treated at the usual legally prescribed pasteurization temperatures, and in most cases at higher temperatures as explained heretofore.

The mixture then may flow to a phase reversing means which breaks the emulsion so that the next step of clarification will remove the fat as a liquid. This clarification may be accomplished by a centrifugal separator which separates from the fat the major fraction of the water phase containing the added off-flavor inhibitor and the non-fat components. Even though the separation is nearly complete, the fat preferably should pass through other separatory means to assure removal of any remaining traces of curd particles or water droplets. The latter are usually discarded. The result is a dry fat ready for use in known ways. As shown on the flow sheet, this fat may be recombined with the non-fat component before drying.

The non-fat milk stream (with inhibitor) that comes out of the separator following the phase-reversing means will in most cases have so little sugar (the inhibitor) content that it can be passed into the fluid non-fat milk stream just following the original separation. It will then be incorporated in the finished non-fat products. If it should happen that there is too much sugar in this sugar-non-fat stream to make it desirable to return it to the non-fat milk stream, it may be discarded without any serious loss because there is so little of it.

Treating a cream to obtain a cream or fat concentrate for special products

Where it is desired to treat a cream in making products other than anhydrous fat, the fat content may or may not be as high as 80% or higher. To make such a cream concentrate the quantity of off-flavor inhibitor added is increased in proportion to the increased amount of skim milk solids present in the cream. For example, in treating a 40% fat cream, I would add approximately triple the amount of inhibitor specified for treating an 80% fat cream, and in a 50% fat cream, I would use about 2½ times as much inhibitor, or about 4 to 8 pounds and about 3 to 6 pounds respectively per 100 pounds of cream. These percentages are given for illustration. They are not limiting as they are not the only percentages which will achieve the desired results. The percentage of off-flavor inhibitor added will decrease proportionately as the fat content of the cream is increased. The aim is to use as little inhibitor as possible and yet prevent production of the undesired off-flavor in the cream concentrate and in the products in which it is subsequently incorporated.

It is also preferable to use an off-flavor inhibitor like lactose or glucose because of their low degree of sweetening power as compared to sucrose.

In treating the cream to obtain products other than anhydrous fat, the cream does not need to be passed through the equipment provided for making anhydrous fat. As shown on the flow sheet after pasteurization and heat treating the cream concentrate may pass to immediate use, or it may be reduced in temperature in a chiller for storage as a cream or fat concentrate ready for storage and use in known ways.

My investigation as to the reasons why my process works as it does to prevent impartation of an off-flavor to the milk components is not completed. One possible theory is that the trouble has come in the past from heating the non fat or skimmed milk component in the presence of the fat or cream component. It is most likely that the heating of the non fat produces substances which cause the off-flavor. Then the fat being present takes up this flavor so that when the fat is used later to make a milk product the unwanted flavor is there.

What I have done therefore is to separate part of the non-fat (the skimmed milk) from the fat (the cream) so as to reduce the amount of non fat that will be present when the fat is raised in temperature for pasteurization and heat treating. Then before heating, I add to this fat non-fat mixture an off-flavor inhibitor (a sugar or mixture of sugars) the presence of which seems to have the effect of preventing formation of the off-flavor something, whatever it is. In other words, I have cut down on the amount of skim that will be heat treated in the presence of the fat and then before treatment I add an off-flavor inhibitor, proportioned according to the percentage of non fat (the skimmed milk) present. This seems to prevent the skimmed milk from producing the off flavor substances which the fat takes up and that is in evidence later as "off-flavor."

The fluid non-fat milk when processed into a final form is of such high quality that very acceptable products may be made from it. The problem in the past has been to recombine this non fat milk product with a milk fat product to produce milk, cream, chocolate milk, ice cream, cheddar cheese, or other products of which milk fat is a part, having a flavor character typical of such products when derived from fresh milk. The off flavor which develops in the fat has been the problem and the present invention shows a method for preventing the development of this off flavor and thus insuring its absence in the recombined products.

The dry fat product, processed by the above method, can be packed and shipped anywhere around the wold and can be used at remote locations to make milk, for example, simply by recombining the dry fat product (3½%) and the dry non-fat product (8¾%) with water (87¾%). The percentage of fat or non fat can be varied to suit.

To make cream having the original natural flavor of fresh cream, the percentage of fat and total milk solids would be greater than for milk and would require less water. To make ice cream, the operator would take cream prepared to a desired composition, and merely add the sugar, stabilizer and flavoring ingredient after which this mixture would be frozen, usually after pasteurization.

The basic milk ingredients in the form of a dry fat or a cream concentrate, the processing of which I have described in the foregoing, may be utilized in the preparation of a wide variety of milk products for consumption as milk or as ingredients for other products of which they may be a component.

The preparation of such products may be effected by proportionately blending these ingredients in their concentrated or substantially dry state as the case may be with appropriate quantities of water and/or other ingredients to produce fluid, concentrated or substantially dry, fat-bearing milk products of natural and acceptable flavor characteristics, or other food products of which such milk products may be an ingredient.

I claim:

1. The process of preventing the formation of heat induced off-flavor characteristics in a fat concentrate produced from fresh whole milk, wherein the fat concentrate may be used at some future time to make dairy products having a natural fresh flavor, comprising the steps of separating the fat component from the bulk of the non-fat components, and increasing the sugar content of said fat component prior to heating the fat-sugar mixture.

2. A process for the conversion of the fat component in fresh whole milk into a fat concentrate uncontaminated by heat process induced off-flavor characteristics and adapted to be used at some future time to make dairy products having a natural fresh flavor, which includes the steps of separating the cream from the bulk of the non-fat components, and increasing the sugar content of said cream prior to heating said sugar-cream mixture at least to the temperature required for pasteurization.

3. A method for the manufacture of dry milk fat from fresh milk, including the steps of separating the cream from the bulk of the non fat milk, adding a small amount of a sugar to the cream, heating the cream and sugar mixture, breaking the emulsion, separating out the sugar and the non fat solids together with the bulk of the water of the treated cream and then processing the fat to a dry form.

4. A method for the manufacture of a milk fat concentrate from fresh milk, including the steps of separating the cream from the bulk of the non fat concentrate milk, adding a small amount of sugar inhibitor to the cream, heating the cream and sugar mixture, breaking the emulsion, separating out the sugar and the non fat solids together with the bulk of the water of the treated cream and then processing the fat to a concentrated form.

5. The method of claim 4 in which the sugar is a lactose.

6. A method for the manufacture of a milk fat concentrate from fresh milk, including the steps of separating the cream containing from 40 to 80% fat from the non-fat milk, adding a small amount of a sugar to the cream, heating the cream and sugar mixture, breaking the emulsion, separating out the sugar and the non fat solids together with the bulk of the water of the treated cream, and then processing the fat into a concentrated form.

7. The method of claim 6 in which the sugar is a lactose.

8. In a process for the production of dry milk fat, the steps of introducing into a high fat cream a small amount of a sugar as an off flavor inhibitor before said cream is subjected to heating for pasteurization and heat treatment and then extracting said sugar from said cream after the heat treatment.

9. The process of claim 8 in which the sugar is sucrose.

10. The process of claim 8 in which the sugar is lactose.

11. The process of claim 8 in which the sugar is glucose.

12. The method of preventing off-flavor in milk fat which comprises separating the cream from the bulk of the non-fat milk and then adding sugar to the cream before it is heat treated.

13. The method of claim 12 in which the sugar is a lactose.

14. The method of claim 12 to which is added the step of separating out the sugar before the heat treated cream is converted to dry fat.

15. The method of claim 12 to which is added the step of separating out the sugar as the heat treated cream is further concentrated.

16. The method of claim 15 in which the sugar is a lactose.

17. The improvement in the art of drying milk which is subsequently to be recombined to make a milk product which comprises separating the milk into fat and non-fat portions, adding to the fat portion a sugar so that upon subsequent heating no disagreeable odor and flavor are imparted to the fat and heat treating the fat portion.

18. The method of claim 17 in which the sugar is a lactose.

19. The method of claim 17 in which the sugar added is in the ratio of about 1½ to 3 percent by weight of a cream containing in the neighborhood of 80 percent fat to be treated.

20. The method of claim 19 in which the sugar is a lactose.

21. The method of claim 17 in which the sugar added is proportioned in the ratio of from 8 to 1½ percent by weight of a cream containing between 40 percent to 80 percent fat respectively to be treated.

22. The method of claim 21 in which the sugar is a lactose.

23. The process of treating cream without imparting to the fat thereof a disagreeable odor and flavor characterized by the step of adding to the cream a sugar prior to the heating of said cream to temperatures high enough for pasteurization.

24. The method of claim 23 in which the sugar is a lactose.

25. A process for the conversion of the cream in fresh whole milk into a fat component uncontaminated by off-flavor characteristics and adapted to be used at some future time to make a dairy product having a natural fresh flavor, which includes the steps of separating the cream from the bulk of the non-fat components; mixing a sugar with said cream, and heating said mixture.

26. The method of claim 25 in which the sugar is a lactose.

27. A process for the conversion of the fat component in fresh whole milk into a fat concentrate uncontaminated by heat process induced off-flavor characteristics and adapted to be used at some future time to make dairy products having a natural fresh flavor, which includes the steps of separating the cream from the bulk of the non-fat components, increasing the sugar content of said cream, and then heating said cream-sugar mixture at least to the temperature required for pasteurization.

28. The method of claim 27 in which the sugar is a lactose.

29. A process for the conversion of the fat in fresh whole milk into a fat concentrate uncontaminated by heat-induced off-flavor characteristics and adapted to be used at some future time to make dairy products having a natural fresh flavor, which includes the steps of separating cream from the bulk of the non-fat components, increasing the sugar content of said cream, heat treating the sugar-cream mixture, separating the sugar from said cream, and drying the cream.

30. The method of claim 29 in which the sugar is a lactose.

31. The method of treating the fat and non-fat components of milk so that when recombined at a future time they will not have a heat-induced off-flavor, which includes the steps of separating the bulk of the non-fat milk component from the fat component; processing the non-fat component to a dry state separately from the fat component; adding sugar to the fat component in direct proportion to the percent of non-fat milk remaining in the fat component after the foregoing separation step; heating the fat component with the sugar present to temperatures at least as high as pasteurization; reversing the phase of said fat component; separating the sugar and remaining non fat milk component from the fat component; and drying the fat component.

32. The method of claim 31 in which the sugar is a lactose.

33. The method of treating the fat and non-fat components of milk so that when recombined at a future time they will not have a heat-induced off-flavor, which includes the steps of separating the bulk of the non fat milk component from the fat component; processing the non fat component separately from the fat component; adding sugar to the fat component in direct proportion to the percent of non fat milk remaining in the fat component after the foregoing separation step; heating the fat component with the sugar present to temperatures at least as high as pasteurization; reversing the phase of said fat component; separating the sugar and remaining non fat milk component from the fat component; and mixing and drying the non-fat component and the treated fat component.

34. The method of claim 33 in which the sugar is a lactose.

GROVER D. TURNBOW.

References Cited in the file of this patent

UNITED STATES PATENTS

| Number | Name | Date |
| --- | --- | --- |
| 2,319,362 | Wouters | May 18, 1943 |
| 2,392,401 | North et al. | Jan. 8, 1946 |